United States Patent [19]
Van Berkel

[11] Patent Number: 5,903,570
[45] Date of Patent: May 11, 1999

[54] TIMING CIRCUIT USING HANDSHAKE CONNECTIONS

[75] Inventor: Cornelis H. Van Berkel, Eindhoven, Netherlands

[73] Assignee: U.S. Philips Corporation, New York, N.Y.

[21] Appl. No.: 08/673,783

[22] Filed: Jun. 20, 1996

[30]     Foreign Application Priority Data

Jun. 23, 1995  [EP]  European Pat. Off. ............... 95201717

[51] Int. Cl.⁶ ........................................................ H04J 3/06
[52] U.S. Cl. ............................................ 370/503; 375/359
[58] Field of Search ..................................... 370/503, 507, 370/522, 524; 375/356, 358, 360, 370, 354, 369, 260

[56]         References Cited

U.S. PATENT DOCUMENTS 4,092,492  5/1978  Eachus ..................................... 375/360
5,319,637  6/1994  Taniguchi et al. ...................... 370/522

FOREIGN PATENT DOCUMENTS 62-95654  5/1987  Japan .

OTHER PUBLICATIONS

"Asynchronous Circuits for Low Power: A DCC Error Corrector", by Keen van Berkel et al, in IEEE Design and Test of Computers, vol. 11 (1994), No. 2, pp. 22–32.

"A Fully Asynchronous Low–Power Error Corrector for the DCC Player", by Kees van Berkel et al, in IEEE Journal of Solid State Circuits, Dec. 1994, vol. 29, No. 12, pp. 1429–1439.

*Primary Examiner*—Jason Chan
*Assistant Examiner*—Jasper Kwoh
*Attorney, Agent, or Firm*—Brian J. Wieghaus

[57]         ABSTRACT

In an asynchronous circuit (i.e. a circuit without a clock coupled to all parts of the circuit) synchronization is provided by a network of synchronization circuits. Handshake connections exist between pairs of synchronization circuits. These connections comprise a single conductor on which a first synchronization circuit realizes a first potential transition which serves as an attention signal for a second synchronization circuit. The second synchronization circuit applies the attention signal to other synchronization circuits by forming similar attention signals on one or more further conductors. After acknowledgement of said attention signals, the synchronization circuit acknowledges the original attention signal by returning the potential on the conductor to its level prior to the original attention signal.

21 Claims, 8 Drawing Sheets

TIMING CIRCUIT USING HANDSHAKE CONNECTIONS

BACKGROUND OF THE INVENTION

The invention relates to a circuit, comprising a network of channels and synchronization circuits for coordinating the timing of operations of asynchronously operating sub-circuits which are connected to a periphery of the network, each channel being coupled between an own pair of synchronization circuits which are arranged to execute successive handshakes together, in each handshake a first and a second synchronization circuit of the own pair successively sending one another, via the channel, an attention signal and an acknowledge signal, at least one synchronization circuit in said circuit being coupled between a first and a second one of the channels and being arranged to start a handshake on the second channel upon reception of the attention signal on the first channel, and to generate an acknowledge signal on the first channel in response to the completion of said handshake, all synchronization circuits in said network being connected to one another by the channels, either directly or via other synchronization circuits, so that the handshakes can propagate to the sub-circuits through the network.

An asynchronously operating circuit of this kind is known from the article "Asynchronous Circuits for Low Power: A DCC Error Corrector", by K. van Berkel, R. Burgess, J. Kessels, M. Roncken, F. Schalij and A. Peeters in IEEE design and test of computers Vol. 11 (1994), No. 2, pp. 22 to 32 (see also "A Fully Asynchronous Low-Power Error Corrector for the DCC Player" by the same authors in IEEE Journal of solid state circuits, December 1994, Vol. 29 No. 12, pp. 1429–1439).

The network forms part of an asynchronous signal processing circuit. The network provides coordination of the timing of the operations of various sub-circuits of the signal processing circuit. For example, registers are coupled to a part of the synchronization circuits. The network then ensures that the contents of the registers are not replaced before they have been taken over by other circuits.

The coordination of the timing means that a second sub-circuit may commence a second operation only after a first sub-circuit has completed a first operation. The first sub-circuit itself may commence a further operation only after the second sub-circuit has completed the second operation. In an asynchronous circuit this is achieved by exchanging a handshake between the first and the second sub-circuit. This handshake involves an attention signal which is applied to the second sub-circuit by the first sub-circuit when the first operation is ready. The handshake also involves an acknowledge signal which is applied to the first sub-circuit by the second sub-circuit after completion of the second operation. It is only after it has received the acknowledge signal that the first sub-circuit may apply a new attention signal to the second sub-circuit.

Completion of the first operation will often be a condition for the start of operations in a plurality of sub-circuits. The start of the second operation may also be dependent on the completion of operations in a plurality of sub-circuits.

In that case the timing is coordinated by means of the network. The synchronization circuits ensure the completion of a handshake from one sub-circuit with several sub-circuits or the reception of handshakes from different sub-circuits. For example, there are synchronization circuits which generate a new attention signal in each of two channels in response to an attention signal and which, after reception of an acknowledge signal, generate an acknowledgement of the original attention signal in each of these channels. The handshakes in two channels can also be forcibly coordinated in succession by such synchronization circuits.

The channels via which the handshakes are exchanged utilize four-phase signaling in conformity with said publication. To this end, two conductors are used per channel. The attention signal commences with a potential level transition on a first conductor. The acknowledge signal commences with a potential level transition on a second conductor. After this transition, the potential on the first conductor returns to its original level so as to signify that the acknowledge signal has been received. Finally, the potential on the second conductor returns to its original level so as to signify that a new attention signal may be issued.

The four-phase handshake requires a minimum time: each of the four potential transitions involved requires some time. This minimum time is a critical property of the circuit, notably because the minimum times accumulate in a network of synchronization units in which the handshake must propagate to and fro through the network. Furthermore, two conductors are required so that, for example a handshake between different integrated circuits requires each time two IC pins per channel.

From Japanese published Patent Application No. 62-95654 a pair of latches is known which is connected via a number of conductors for data and via a control conductor. The latches indicate the fact that the data on the conductors for data is valid and the fact that the data has been latched (so that it can be removed from the connection) by way of mutually opposed transitions in a potential level on the control conductor.

U.S. Pat. No. 5,142,632 discloses a circuit with a number of clocked control modules which exchange instructions and execution messages under the control of semaphores. Each semaphore is activated and de-activated by mutually opposed transitions in the potential level on a conductor.

It is inter alia an object of the invention to reduce the minimum time required for a handshake. It is another object of the invention to limit the number of conductors per channel.

SUMMARY OF THE INVENTION

The circuit in accordance with the invention is characterized in that at least the first and the second one of the channels comprise a single conductor each and that on each of these conductors the attention signal and the acknowledge signal of the handshake are formed by mutually opposed transitions in a potential level on the conductor. Thus, per handshake only two potential level transitions are required, so that the handshake is faster than a four-phase handshake.

Japanese Patent Application No. 62-95654 generates the opposed potential level transitions by way of a wired-OR configuration. Each of the latches can thus pull the conductor to a low potential level by turning on an own switching element between the conductor and the first supply terminal.

Prior to the attention signal, only the first latch keeps its own switching element turned on. The attention signal is generated by turning this switching element off. The second latch detects that the potential level on the conductor thus rises, latches the data in response thereto and, after completion of latching, generates the acknowledge signal by turning on its own switching element.

The potential level on the conductor thus returns to the value prevailing prior to the attention signal. This is detected by the first latch which turns on its own switching element again in response thereto. The second latch keeps its own switching element turned on for a brief period of time after the acknowledge signal and subsequently turns it off. The circuit thus returns to the initial state and a next attention signal may be generated.

The period of the time for which the second latch postpones the turning off of its own switching element must at least be so long that it is certain that the first latch has turned on its own switching element. If the second latch were to turn off its switching element prematurely, a potential transition would occur on the conductor which cannot be distinguished from an attention signal from the first latch. The response time of the first latch, however, is subject to spreading, for example due to process spreads or temperature fluctuations. The period of time must at least be so long that it can cope with the response time of the first latch even in the worst case.

However, the period of time at the same time prolongs the minimum time required for a handshake. The necessity of choosing a time interval longer than the worst case time interval, therefore, has the drawback that the operating frequency of the circuit is unnecessarily limited.

Furthermore, the circuit continues to draw current between the acknowledge signal and the next attention signal. This increases the energy consumption of the circuit. This drawback notably when a network of synchronization circuits communicating by way of one-line handshakes is included in an integrated circuit.

It is a further object of the invention to solve these problems.

To this end, an embodiment of the circuit in accordance with the invention is characterized in that the first or the second one of the channels connects the first synchronization circuit to a second synchronization circuit, that the first and the second synchronization circuit comprise an own switching element each of which is connected between the conductor and a first and a second supply terminal, respectively, and that the first and the second synchronization circuit are both arranged to realize an own transition from the handshake by turning on the own switching element and, once the own transition has thus been realized, by subsequently turning it off again.

The attention signal and the acknowledge signal are thus generated both by conductively connecting the conductor to a supply terminal. The handshake is fast because the switching element whereby it is realized is turned off directly, without deliberately introduced delay, after the attention signal or the acknowledge signal. The impedance between the conductor and the supply terminal whereto the conductor was connected then becomes comparatively much higher than when the switching elements are turned on; a further change of the potential level on the conductor via said impedance is hardly possible, and slow if at all. Such a change, if any, is not disturbing if the frequency of handshakes is sufficiently high.

A further embodiment of the circuit in accordance with the invention is characterized in that the first and the second synchronization circuit both have an own feedback circuit which is coupled between the conductor and a control input of the own switching element of the relevant synchronization circuit in order to turn off said own switching element in response to the detection of completion of the own transition by the relevant synchronization circuit. The feedback circuit ensures that the switching element is turned off as quickly as possible after completion of the transition. The maximum achievable frequency of handshakes is thus increased.

A further embodiment of the circuit in accordance with the invention is characterized in that the first synchronization circuit comprises a further own switching element which is connected between the conductor and the second supply terminal, and control means which are coupled between the conductor and a control input of the further own switching element, the control means being arranged to turn on the further own switching element in response to the detection of the transition realized by the second sub-circuit, and to turn it off when the opposite transition is realized. The first synchronization circuit thus takes over the control of the potential level on the conductor as soon as possible after the second synchronization circuit has realized a transition. This counteracts possible drift of the potential level on the conductor or possible sensitivity of said potential level to interference pulses.

A further embodiment of the circuit in accordance with the invention is characterized in that the transition realized by the second sub-circuit adjusts the potential level from a first to a second potential range, which ranges are separated from one another by a non-void intermediate range, that the control means turn on the further own switching element when the potential level leaves the first potential range, and that the feedback circuit of the second synchronization circuit turns off the own switching element of the second synchronization circuit when the potential level reaches the second potential range. It is thus ensured that upon the potential transition the first synchronization circuit takes over the control of the potential on the conductor before the second synchronization circuit abandons the control. This reduces the sensitivity to interference pulses or drift.

The invention can be used in a variety of synchronization circuits which impose different constraints as regards the mutual timing of the handshakes on at least three channels. This concerns, for example     sequencing, where the handshake on the third channel is started in response to completion of the handshake on the second channel and the acknowledge signal on the first channel is generated in response to completion of the handshake on the second channel,     forking, where the handshakes on the second and the third channel are started independently of one another in response to the attention signal, the acknowledge signal on the first channel being generated in response to completion of the handshake on the second as well as the third channel,     joining, where the handshake on the second channel is started after reception of an attention signal on the first as well as the third channel, and where an acknowledge signal is generated on the first as well as the third channel in response to completion of the handshake on the second channel.

mixing, where the handshake on the second channel is started after reception of an attention signal on one of the first and third channels, and where in response to completion of the handshake on the second channel an acknowledge signal is generated on the one channel on which the attention signal was received.

The invention can also be used for a circuit in which at least one of the synchronization circuits is a repeater circuit which is coupled to a channel comprising a single conductor and is arranged to generate, each time in response to a potential level transition on the single conductor, an opposed potential level transition on the single conductor. The repeater circuit starts a new cycle each time after completion of a cycle of the circuit.

An embodiment of the circuit in accordance with the invention is characterized in that the network is acyclic, that each of the synchronization circuits is arranged to adjust all channels on which it can generate attention signals to an initial potential level which corresponds to the level which directly precedes an attention signal, provided that all channels on which the relevant synchronization circuit can receive attention signals are at said initial potential level, and that the respective relative drive powers of the synchronization circuits are chosen so that the synchronization circuits are capable of adjusting the channels on which they can generate attention signals to the initial potential level, irrespective of the driving of said channels by the other synchronization circuits. The circuit itself is thus capable of adjusting itself to an initial state in which the handshakes can be processed without further steps being required upon switching on.

These and other aspects of the invention will be apparent from and elucidated with reference to the embodiments described hereinafter.

DESCRIPTION OF THE PREFERRED EMBODIMENTS

A network of synchronization circuits

Figure 1:
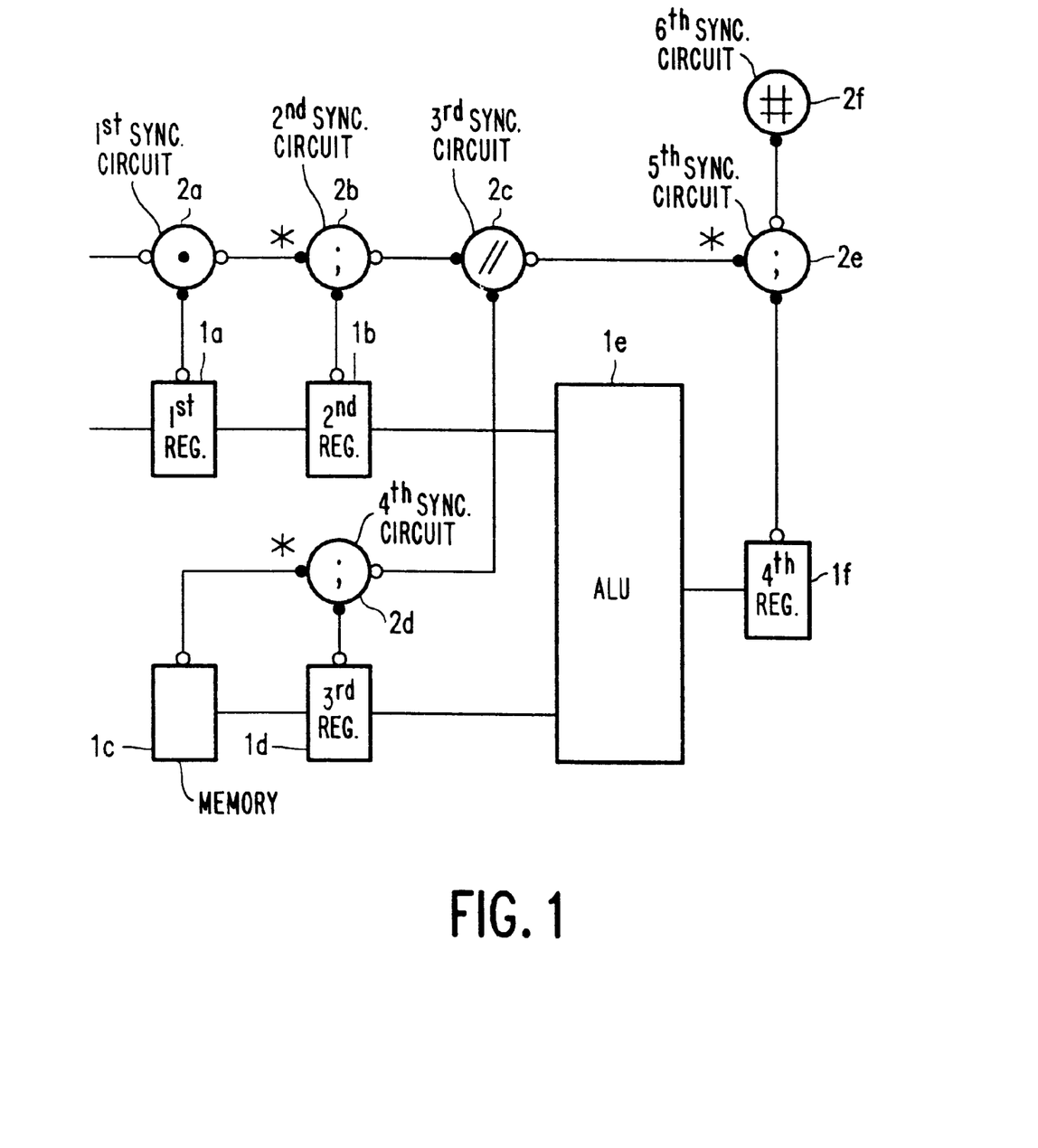
FIG. 1 shows an example of a circuit comprising a plurality of sub-circuits whose timing is coordinated via synchronization circuits.

FIG. 1 shows an example of a circuit which comprises a plurality of sub-circuits whose timing is coordinated via synchronization circuits. This circuit serves as an example illustrating the operation of a network of synchronization circuits and is not meant to be a preferred embodiment of such a network.

The circuit comprises a number of sub-circuits $1a$–$f$. The circuit comprises an input which is coupled to a first register $1a$, an output of which is coupled to a second register $1b$. The output of the second register is coupled to an ALU (Arithmetic Logic Unit) $1e$. The circuit also comprises a cascade of a memory $1c$ and a third register $1d$, coupled to the ALU $1e$. An Output of the ALU $1e$ is coupled to an input of a fourth register $1f$.

The circuit also comprises a network of synchronization circuits $2a$–$f$ which is coupled to the sub-circuits $1a$–$f$. Terminals are shown for each synchronization circuit $2a$–$f$. A first synchronization circuit $2a$ is coupled to an external input, to the first register $1a$ and to a second synchronization circuit $2b$. The second synchronization circuit $2b$ is coupled to the second register $1b$ and to a third synchronization circuit $2c$. The circuit comprises a fourth synchronization circuit $2d$ which is coupled to the memory $1c$ and the third register $1d$ and to the third synchronization circuit $2c$. The third synchronization circuit $2c$ is also coupled to a fifth synchronization circuit $2e$. The fifth synchronization circuit $2e$ is coupled to the fourth register $1f$ and to a sixth synchronization circuit $2f$.

During operation the circuit of FIG. 1 loads data into the first register $1a$, transports this data from the first register $1a$ to the second register $1b$ and further to the ALU $1e$. The circuit also transports data from the memory $1c$ to the ALU via the third register $1d$. The ALU processes the data and the result is loaded into the fourth register $1f$.

The network of synchronization circuits $2a$–$f$ coordinates the timing of the operations of the various sub-circuits $1a$–$f$ by way of one-line handshakes; it ensures, for example that a register is always loaded only after valid data is present on its input. To this end, various synchronization circuits $2a$–$f$ are coupled to the sub-circuits $1a$–$f$.

In the case of a one-line handshake, such a synchronization circuit $2a$–$f$ generates, for example an attention signal for the connected sub-circuit $1a$–$f$. In response thereto the sub-circuit $1a$–$f$ carries out an operation and signals the completion of said operation to the synchronization circuit $2a$–$f$ by way of an acknowledge signal. The synchronization circuits also exchange one-line handshakes between themselves. A number of synchronization circuits $2a$–$f$ of FIG. 1 comprises a plurality of connections. Each of these synchronization circuits impose a predetermined time relation on the one-line handshakes which can be realized on the connected connections.

The synchronization circuits in FIG. 1 are represented by circles in which a respective symbol is drawn so as to symbolize the time relations imposed by the relevant synchronization circuit $2a$–$f$. FIG. 1 shows the following types of synchronization units:

| | |
|---|---|
| fork | (for example, 2c) generates a respective further attention signal on each of a number of active connections upon reception of an attention signal on a passive connection; generates an acknowledge signal on the passive connection after reception of acknowledge signals on all active connections. |
| join | (for example 2a) comprises a number of passive connections and an active connection; generates an attention signal on the active connection if an attention signal has been received on all passive connections; generates, after reception of |

| | |
|---|---|
| | an acknowledge signal on the active connection, respective acknowledge signals on all passive connections. The "join" circuit is equivalent to a "fork" circuit if the role and polarity of passive connections and active connections are reversed. |
| sequencer | (for example, 2b, 2d, 2e) generates, upon reception of an attention signal on a passive connection, an attention signal on a first active connection (denoted by an *); generates, after reception of an acknowledge signal on the first active connection, an attention signal on a second active connection. After reception of the acknowledge signal on the second active connection, the sequencer generates an acknowledge signal on the passive connection. |
| repeater | (for example, 2f) generates a predetermined number of attention signals on an active connection (except for the first one, each time after reception of an acknowledge signal). |

In the case of a one-line handshake each connection to a synchronization circuit 2a–f serves for transmitting a signal (for example, the attention signal) as well as for receiving a signal (for example, the acknowledge signal). The connections to the synchronization circuits 2a–f are distinguished as "passive connections" (or inputs) and "active connection" (or outputs). It will be evident from the foregoing that a distinction is thus made between connections on which the relevant synchronization circuit generates acknowledge signals and attention signals (passive connections and active connections, respectively). In FIG. 1 the passive and active zation circuit 2b. The first synchronization circuit 2a acknowledges these attention signals as soon as the first register indicates, by way of an acknowledge signal, that the data has been loaded.

FIG. 1 shows merely an example of feasible synchronization circuits 2a–f. For example, the repeater 2f in its turn could be started, for example by an attention signal on a further passive connection and could apply an acknowledge signal to said active connection after a predetermined number of handshakes. Further examples of synchronization circuits are:

| | |
|---|---|
| mixer | comprises a number of passive connections and one active connection; generates an attention signal on the active connection if an attention signal has been received on one of the passive connections; generates, after reception of an acknowledge signal on the active connection, an acknowledge signal only on the relevant passive connection. |
| arbiter | determines which of the attention signals on a plurality of passive connections has priority (for example, by arriving first); applies this signal to an active connection associated with the passive connection; attention signals on other passive connections are passed on only after reception of the acknowledge signal. | connections are symbolized by white dots and black dots, respectively, shown against each synchronization circuit 2a–f.

During operation the sixth synchronization circuit 2f generates an attention signal. This signal is received by the fifth synchronization circuit 2e. In response thereto, it applies an attention signal to the third synchronization circuit 2c. After some time this attention signal is responded to by means of an acknowledge signal, signifying that valid data is available on the output of the ALU 1e. In response thereto the fifth synchronization circuit 2e applies an attention signal to the fourth register 1f. In response thereto this register loads the data and, once loading has been completed, it applies an acknowledge signal to the fifth synchronization unit 2e. In response thereto the latter applies an acknowledge signal to the sixth synchronization unit 2f, after which the entire process is repeated.

The other synchronization units 2a–d provide the further coordination. For example, the third synchronization unit 2c ensures that the attention signal from the fifth synchronization circuit 2e is acknowledged only after data has become available on both inputs of the ALU 1e. The data is made available in parallel for the two inputs. The first synchronization unit 2a ensures that the first register 1 loads data only if attention signals have been received from the external passive connection as well as from the second synchroni- An embodiment of the structure of the synchronization circuits 2a–f will be described in detail hereinafter.

One-line handshake circuits

Figure 2A:
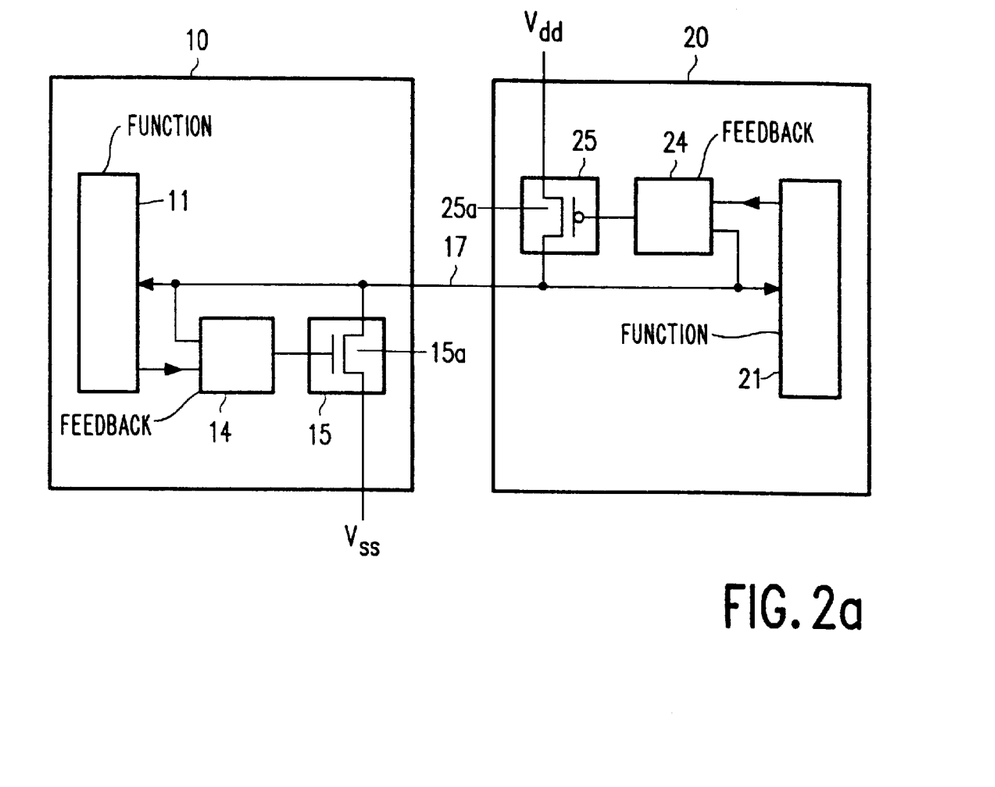
FIG. 2a shows a circuit comprising a first and a second circuit section which are interconnected by a conductor.

FIG. 2a shows a circuit which comprises a first circuit section 10 and a second circuit section 20, which sections are interconnected by a conductor 17. The first circuit section 10 is, for example a sub-circuit arranged to execute a one-line handshake via the conductor, 17. Alternatively, the first circuit section 10 may be a sub-circuit which is connected in series with a synchronization circuit; the conductor 17 is then connected to an active connection of the synchronization circuit. The same holds for the second circuit section 20. The circuit sections 10, 20 will be referred to hereinafter in general as sub-circuits.

The first sub-circuit 10 comprises a pull-down circuit 15 with an NMOS transistor 15a whose channel is coupled between the conductor 17 and a first supply connection Vss. The conductor 17 is coupled to the gate of the transistor 15a via a feedback circuit 14. The second sub-circuit 20 comprises a pull-up circuit 25 with a PMOS transistor 25a whose channel is coupled between the conductor 17 and a second supply connection Vdd. The conductor 17 is coupled to the gate of the transistor 25a via a feedback circuit 24. Each of the sub-circuits 10, 20 comprises a functional part 11, 21 which is coupled to the conductor 17 by way of an input and, by way of an output, to the feedback circuit 14, 24 of the relevant sub-circuit 10, 20. This functional part comprises, for example a register or further sub-circuits and synchronization circuits.

During operation the functional parts 11, 21 execute operations which are in principle independent of one another. At given points, however, coordination of the timing of the operations in the functional parts 11, 21 is required. In that case a given operation in the functional part 21 of the second sub-circuit 20 may commence only after completion of an other operation in the functional part 11 of the first sub-circuit 10. In its turn the functional part 11 of the first sub-circuit may subsequently execute a further operation only if the functional part 21 of the second sub-circuit 20 has completed the given operation.

This coordination of the timing of operations is realized by means of a one-line handshake. The one-line handshake involves an attention signal, originating from the first sub-circuit 10, and an acknowledge signal which originates from the second sub-circuit 20. The attention signal indicates that the functional part 21 of the second sub-circuit 20 may commence the given operation. The acknowledge signal indicates that the functional part of the first sub-circuit 10 may commence the further operation.

The attention signal and the acknowledge signal are both transported via the conductor 17. The attention signal is generated by establishing a conductive connection, via the channel of the NMOS transistor 15a, from the first conductor 17 to the first supply connection Vss. The acknowledge signal is generated by establishing a conductive connection from the conductor 17 to the second supply connection Vdd via the channel of the PMOS transistor 25a.

Figure 2B:
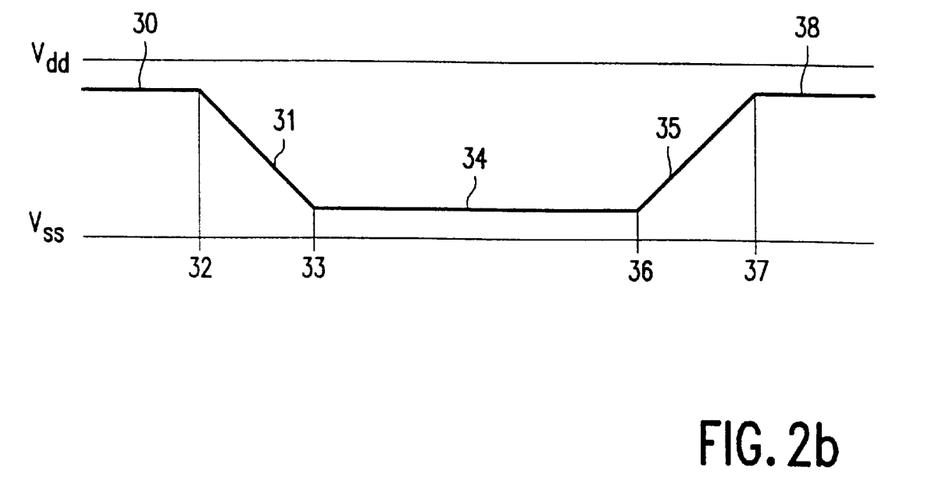
FIG. 2b shows the variation in time of the potential level on the conductor.

This will be illustrated with reference to FIG. 2b. FIG. 2b shows the variation in time of the potential level on the conductor 17. Initially the potential level is high 30 and both transistors 15a, 25a are turned off.

Subsequently, the first sub-circuit 10 generates the attention signal by realizing a transition 31 of the potential level. The transition 31 commences at a first instant 32 in that the feedback circuit 14 turns on the channel of the transistor 15a in response to a signal from the functional part 11. As a result, the potential level on the conductor 17 is pulled down 34. The feedback circuit 14 detects when the potential level has been pulled down sufficiently and in response thereto it turns off the transistor 15a at a second instant 33.

The transition 31 is detected by the functional part 21 of the second sub-circuit 20 which, in response thereto, commences the operation which awaited the attention signal. Once this operation has been completed, the second sub-circuit 20 generates the acknowledge signal by realizing a transition 35 of the potential level. This transition 35 commences at a third instant 36 in that, as signaled by the functional part 21, the feedback circuit 24 turns on the channel of the transistor 25a. As a result the potential level on the conductor 17 is pulled up 38. The feedback circuit 24 detects when the potential level has been pulled up sufficiently and turns off the transistor 25 in response thereto.

The circuit has thus returned to its initial state again and a next handshake may take place. It will be evident that in this context the described polarities (attention signal-potential down, acknowledge signal-potential up) are not essential to the invention. The reverse polarity has the same effect: this is equivalent to the interchanging of the role of the sub-circuits 10, 20, so that the signal generated by the second sub-circuit 20 commences the handshake as an attention signal and the signal generated by the first sub-circuit 10 terminates the handshake as an acknowledge signal.

Figure 3:
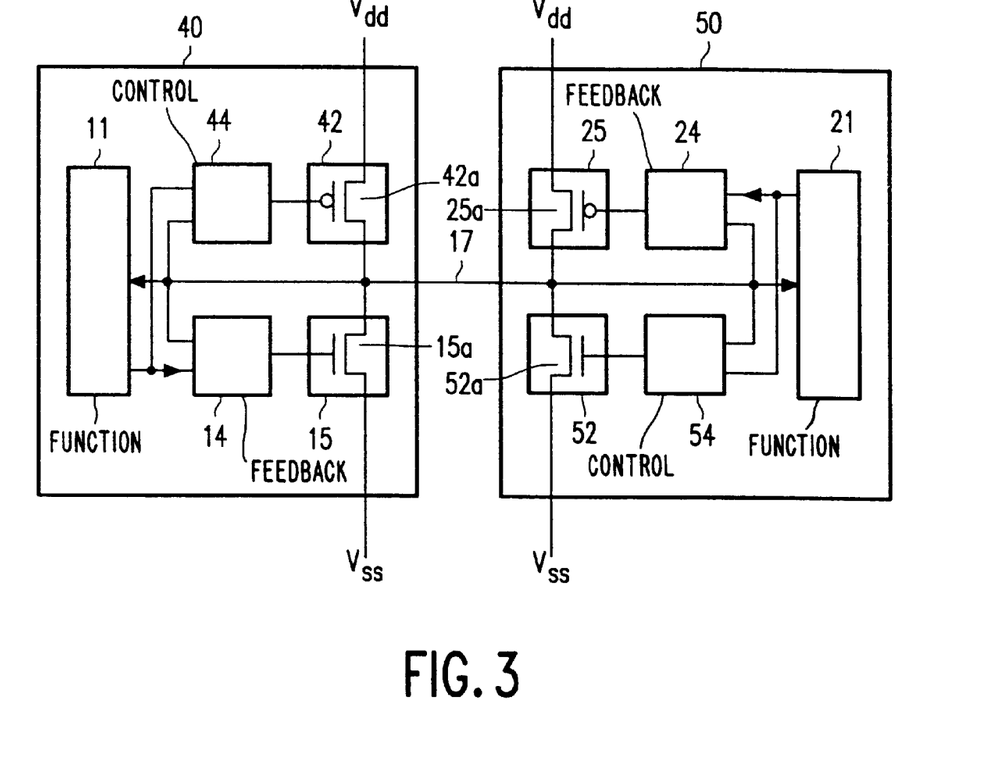
FIG. 3 shows a circuit comprising two sub-circuits.

FIG. 3 shows a circuit which comprises two sub-circuits 40, 50. FIG. 3 shows a number of components which correspond to components of FIG. 2a and which are denoted by corresponding reference numerals. The sub-circuit 40 of FIG. 3 deviates from that shown in FIG. 2a in that there is provided a pull-up circuit 42 with a PMOS transistor 42a whose channel extends between the conductor 17 and the second supply connection Vdd. There is also provided a control circuit 44 whose inputs are coupled to the conductor 17 and to the functional part 11 of the first sub-circuit 40. The output of the control circuit 44 is coupled to the gate of the PMOS transistor 42a.

The sub-circuit 50 of FIG. 3 deviates from that shown in FIG. 2a in that there is provided a pull-down circuit 52 with an NMOS transistor 52a whose channel extends between the conductor 17 and the first supply connection Vss. There is also provided a control circuit 54 whose inputs are coupled to the conductor 17 and to the functional part 21 of the second sub-circuit 50. The output of the control circuit 54 is coupled to the gate of the NMOS transistor 52a.

The supplementary transistors 42a, 52a serve to maintain the conductor at a fixed potential after the acknowledge signal and the attention signal, respectively. When the control circuit 54 in the second sub-circuit detects the potential level transition on the conductor which constitutes the attention signal, it turns on the NMOS transistor 52a. As a result, the NMOS transistor 52a maintains the potential level of the conductor at or near Vss. When the acknowledge signal is generated, the control circuit 54 turns off the NMOS transistor 52a so that the PMOS transistor 25a can pull the potential level to the other supply voltage Vdd as described with reference to FIG. 2a. As a result of the use of the supplementary transistor 52a, the conductor 17 is maintained at a fixed potential level 34 during the time interval between the attention signal and the acknowledge signal, so that the circuit is then insusceptible to interference.

The supplementary transistor 42a and the control circuit 44 in the first sub-circuit 40 have an analogous function in relation to the acknowledge signal. The conductor 17 is thus maintained at a fixed potential level 30, 38 between the acknowledge signal and a subsequent attention signal.

The supplementary transistor 52a is preferably turned on already during the transitions 31. This is achieved by way of a suitable relative choice of the threshold levels of the feedback circuit 14 and the control circuit 54.

Figure 4:
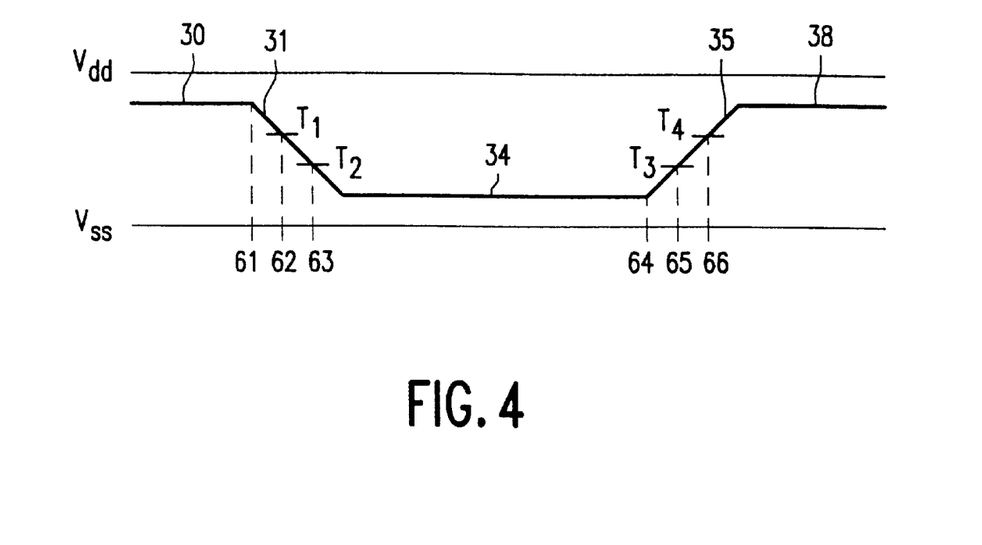
FIG. 4 shows the variation in time of the potential level on the conductor.

This is illustrated in FIG. 4. Like FIG. 2b, FIG. 4 shows the variation in time of the potential level on the conductor 17. Also shown are threshold levels $T_1$, $T_2$, $T_3$, $T_4$. The control circuit 54 turns on the NMOS transistor 52a in the second sub-circuit 50 when it detects that the potential level on the conductor 17 drops below the first threshold $T_1$. The feedback circuit 14 turns off the NMOS transistor 15a in the first sub-circuit 40 when it detects that the potential level on the conductor 17 drops below the second threshold $T_2$. The first threshold $T_1$ is made higher than the second threshold $T_2$.

For the attention signal the NMOS transistor 15a in the first sub-circuit 40 is thus turned on at a starting instant 61. This causes the transition 31. Subsequently, the potential level on the conductor 17 reaches the first threshold $T_1$ at a first instant 62; in response thereto the control circuit 54 turns on the NMOS transistor 52a in the second sub-circuit 50. The potential level on the conductor 17 subsequently reaches the second threshold $T_2$ at a second instant 63; in response thereto, the feedback circuit 14 turns off the NMOS transistor 15a in the first sub-circuit 40. At the starting instant 64 of the subsequent acknowledge signal from the second circuit 50, the control circuit 54 turns off the NMOS transistor 52a in the second sub-circuit and the PMOS transistor 25a in the second sub-circuit is turned on.

Thus, as from the starting instant 61 of the attention signal and beyond, until the starting instant 64 of the next acknowledge signal, a conductive connection always exists between the conductor 17 and the first supply connection Vss. As a result, the potential level on the conductor 17 will be insensitive to interference, for example due to capacitive crosstalk.

For the acknowledge signal such an effect is also achieved in that the control circuit 44 turns on the PMOS transistor 42a at an instant 65 as soon as the potential level on the conductor 17 reaches a third threshold $T_3$. Subsequently, at an instant 66, at which the potential level on the conductor reaches the fourth threshold $T_4$, the feedback circuit 24 turns off the PMOS transistor 25a in the second sub-circuit 50.

The circuits shown in the FIGS. 2a and 4 (plus the circuits to be described hereinafter) and the described process of exchanging an attention signal and an acknowledge signal can also be used for synchronization in a bus environment. In that case, for example a plurality of circuits such as the second circuit 20 are connected parallel to the conductor 17. Only one of these circuits generates, for example an acknowledge signal and maintains, if necessary, the potential level on the conductor 17 after an attention signal.

By suitably choosing the relative drive power of the pull-up and pull-down circuits in the parallel-connected second circuits, moreover, a wired logic configuration can be realized in which each of the parallel-connected second circuits 20 is capable of keeping the potential on the conductor 17 low in the response to the attention signal. Thus, the potential becomes high as an acknowledge signal only if all parallel-connected second circuits 20 pull up the conductor 17. Thus, different second circuits 20 can be made to acknowledge one and the same attention signal. The second circuit 20, acknowledging last, determines when the potential on the conductor 17 becomes low as an acknowledgement. Similarly, a plurality of first circuits 10 can also be connected parallel to the conductor 17. When the drive power of the pull-up and pull-down circuits is suitably chosen, each of these circuits can generate an attention signal when the potential on the conductor 17 is high.

Figure 5:
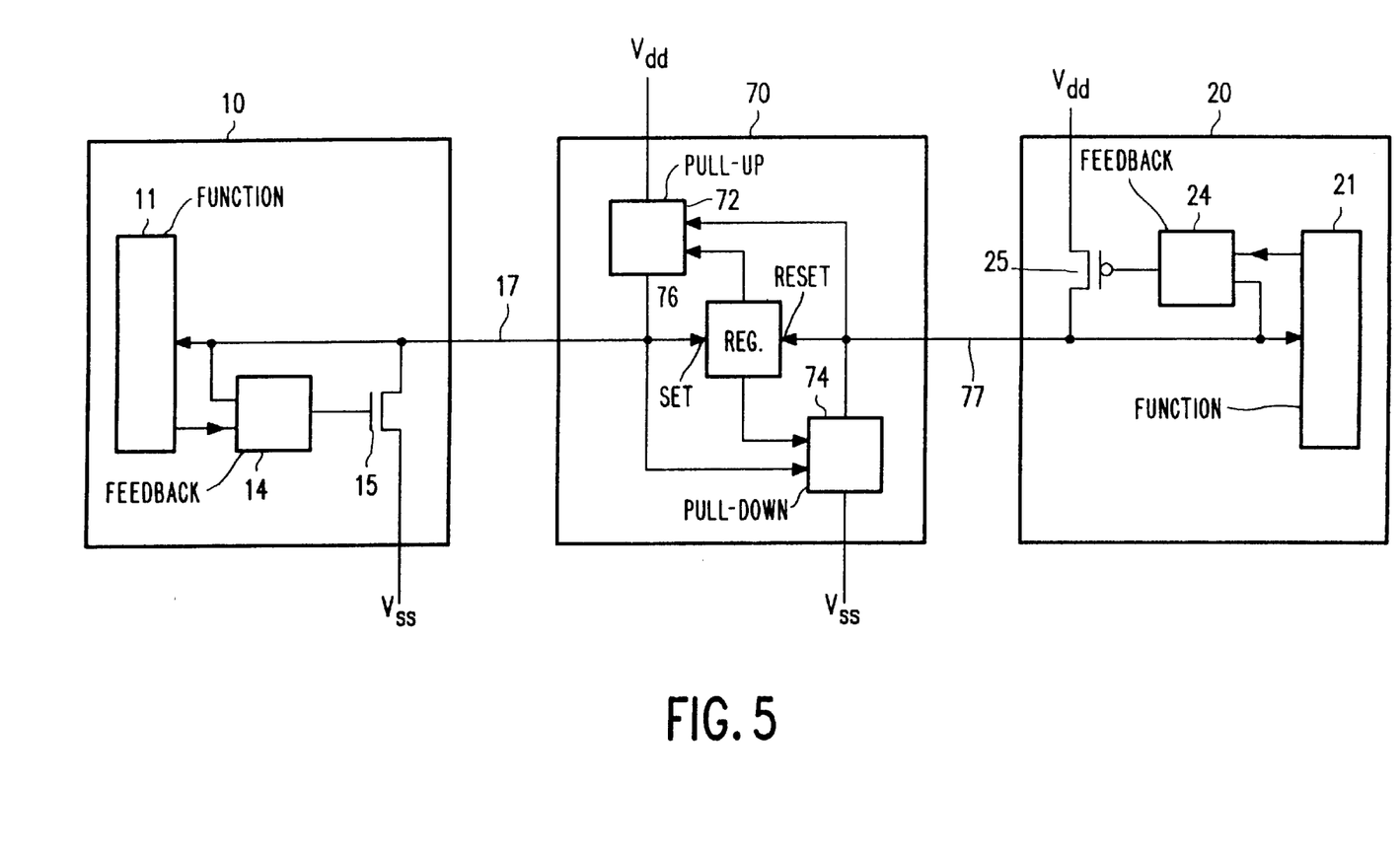
FIG. 5 shows a further embodiment of the circuit in accordance with the invention.

FIG. 5 shows a further embodiment of the circuit in accordance with the invention. The Figure shows three cascade-connected sub-circuits 10, 20, 70, the first and the last (10, 20) of which are constructed as shown in FIG. 2a. The first and the last sub-circuit 10, 20 in the cascade are coupled to the central sub-circuit 70 via conductors 17 and 77, respectively (referred to as input conductor and output conductor, respectively). The central sub-circuit 70 comprises a pull-up circuit 72 which is coupled between the second supply connection Vdd and the input conductor 17. The central sub-circuit 70 also comprises a pull-down circuit 74 which is coupled between the first supply connection Vss and the output conductor 77. The central sub-circuit 70 also comprises a register 76. A set input of the register 76 is coupled to the input conductor 17. A reset input of the register 76 is coupled to the output conductor 77. The input conductor 17 and an output of the register 76 are coupled to respective control inputs of the pull down circuit. The output conductor 77 and a further output of the register 76 are coupled to the control inputs of the pull-up circuit.

During operation the central sub-circuit 70 acts as a gateway circuit for handshakes. This may be useful, for example for passing on the handshake via a conductor which constitutes a high capacitive load or series resistance because of its length. Over the length of the conductor one or more sub-circuits such as the central sub-circuit 70 are then inserted.

During operation the register 76 will initially be reset. Upon reception of the attention signal via the input conductor 17, the pull-down circuit 74 will pull down the potential on the output conductor 77, provided that the register has been reset. The register 76 is then set by the potential variation on the output conductor 77. Upon reception of the acknowledge signal via the output conductor 77, the pull-up circuit 72 will pull up the potential on the input conductor 17, provided that the register 76 has been set. The register 76 is then reset by the potential variation on the input conductor 17.

The register 76 prevents that upon reception of an acknowledge signal on the output conductor 77 an attention signal is immediately formed again on the conductor 77. In the absence of the register 76, the low potential on the input conductor 17 immediately after reception of the acknowledge signal could be mistaken for a new attention signal on the output conductor 77.

The sub-circuit 70 can also be extended, if desired, so as to include control circuits and transistors for taking over the potential on the input and output conductor with a function as described with reference to the FIGS. 2a and 3 (42, 44, 52, 54).

Figure 6:
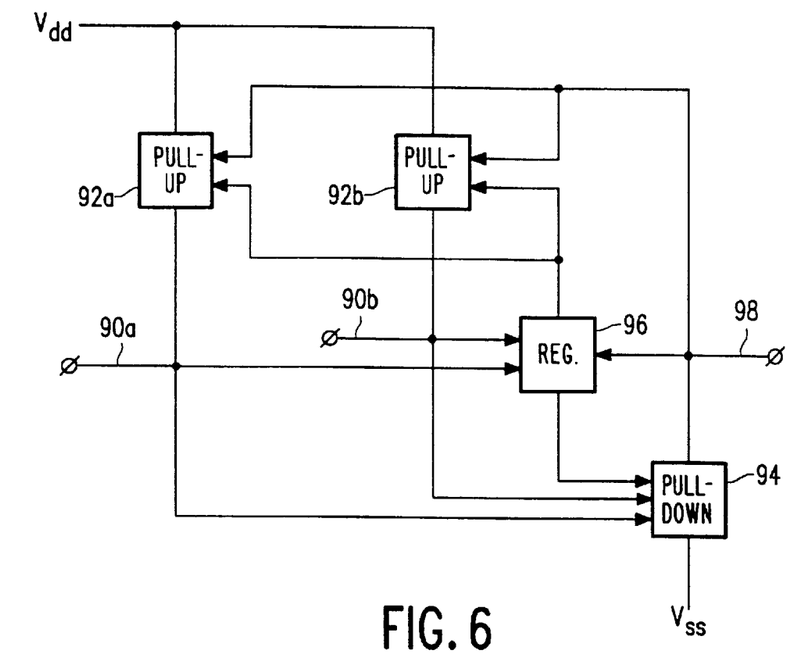
FIG. 6 shows an embodiment of a join unit.

FIG. 6 shows an embodiment of the join unit 2a of FIG. 1. This join unit constitutes a synchronization circuit which comprises a first and a second pull-up circuit 92a,b, a pull-down circuit 94 and a register 96. The connections correspond mainly to those of the central sub-circuit 70 of FIG. 5, be it that there are two input conductors 90a,b, each of which comprises its own pull-lip circuit 92a,b, that these two input conductors 90a,b are coupled to the pull-down circuit 94, and that the output conductor 98 and an output of the register 96 are coupled to both pull-up circuits 92a,b.

The operation of the sub-circuit shown in FIG. 6 also resembles that of the sub-circuit 70 of FIG. 5. During operation the register 96 will initially be reset. The pull-down circuit 94 then generates an attention signal when the potential on the two input conductors 90a,b is low. The register 96 is then set by the potential variation on the output conductor 98. Upon reception of the acknowledge signal via the output conductor 98, both pull-up circuits 92a,b will pull up the potential on their associated input conductor 90a,b, provided that the register 96 has been set. The register 96 is then reset when the potential on the two input conductors 90a,b has become high.

The low potential on the input conductors 90a,b immediately after reception of the acknowledge signal on the output conductor 98 can then be mistaken for new acknowledge signals if only these potential levels are considered. This is prevented by the register 96. In response to the pulling down of the potential on the two input conductors 90a, b an attention signal is formed thereon only if the register is in the appropriate state.

If desired the sub-circuit of FIG. 6 can be extended so as to include control circuits and transistors for taking over the potentials on the input and output conductors as described with reference to the FIGS. 2a and 3 (42, 44, 52, 54).

The join circuit of FIG. 6 is equivalent to the fork circuit if the role of the inputs 90a–b and the output 98 and the power supplies are interchanged.

Figure 7:
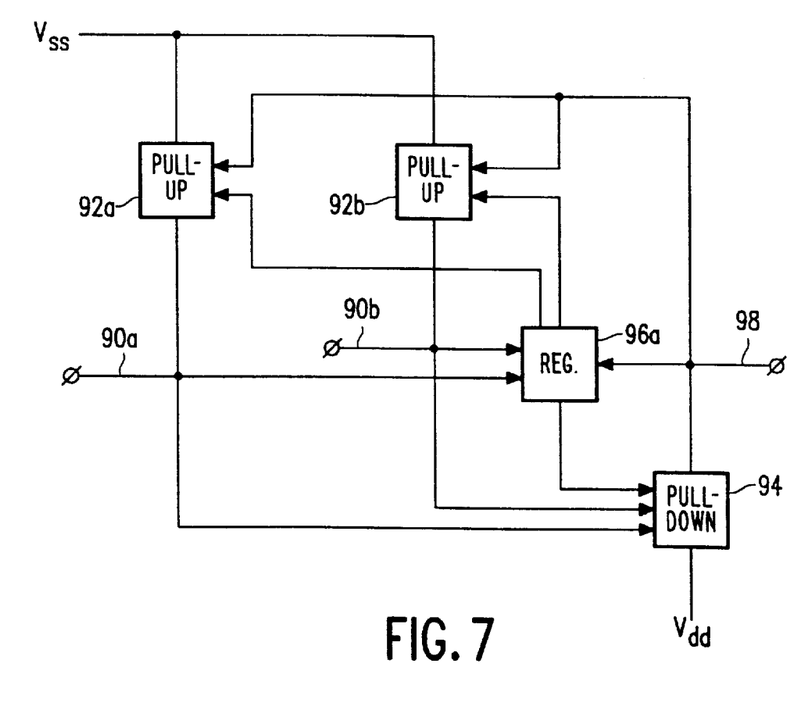
FIG. 7 shows an embodiment of a sequencer.

FIG. 7 shows an embodiment of a sequencer. The structure of this embodiment is mainly the same as that of the join unit of FIG. 6, be it that the following differences exist:

the role of the supply connections has been reversed; the "pull-up" circuits are, therefore, actually pull-down circuits and vice versa; for the sake of clarity, however, they will be referred to by their previous designation; the register 96 has been replaced by a multibit register 96a which comprises a plurality of outputs which are connected to respective inputs of the "pull-up" circuits 92a,b.

The operation of the sequencer is as follows. Initially, the register is in a first state. When the register is in the first state and the potential on the conductor 98 becomes low, the first pull-up circuit 92a generates an attention signal on the conductor 90a. The multibit register 96a is adjusted to a second state by the potential variation on the conductor 90a. When the multibit register 96a is in the second state and the acknowledge signal is received via the conductor 90a, the second pull-up circuit 92a generates an attention signal on the conductor 90b. The multibit register 96b is adjusted to a third state by the potential variation on the conductor 90b. When the multibit register 96a is in the third state and the acknowledge signal is received via the conductor 90b, the pull-down circuit 94 generates an acknowledge signal on the conductor 98. The multibit register 96a is then returned to the first state when the potential on the conductor 98 has become high again due to said acknowledge signal.

The multibit register may comprise, for example two one-bit registers which are both reset when the potential on the conductor 98 has become high again under the influence of the acknowledge signal, each one-bit register being set by the potential variation on an own conductor 90a,b. The output of each of these one-bit registers is then connected to an input of a respective "pull-up" circuit 92a,b.

In the absence of the register 96a the situations before and after the one-line handshakes on the various conductors could be mixed up. The register 96a thus prevents an attention signal from being formed on a conductor, immediately upon reception of an acknowledge signal on the relevant conductor, prior to completion of the entire sequencer cycle.

Prior to the operation of a circuit comprising a network of synchronization circuits, all synchronization circuits must be adjusted to the initial state in which they can receive attention signals. This can in principle be achieved by means of additional pull-up transistors, each of which has a channel coupled between a respective conductor and the supply connection Vdd. The gate electrodes of these transistors are interconnected. Upon initialization the additional transistors are turned on for a limited time interval, so that the conductors are forced to the correct initial state, i.e. the high potential state.

However, subject to a number of conditions the initialization can also be performed without additional transistors. A first condition consists in that the network must be acyclic: the active connection (connections) (for dispatching an attention signal) of a synchronization circuit may not be coupled to the passive connection (connections) (for receiving attention signals) via the network.

A further condition consists in that all synchronization circuits must satisfy the so-called "initial-when-closed" condition. According to this condition, each of the synchronization circuits must be constructed so that it enters the initial state if all connections on which it can receive attention signals are at the potential level prevailing before the attention signal. In this initial state the synchronization circuit must adjust all connections on which it can dispatch attention signals to the potential level prevailing directly prior to the attention signal.

If the synchronization circuit dispatching attention signals via a channel controls the conductor of the relevant channel to the potential level prevailing directly prior to the attention signal, moreover, such dispatch must have priority over other control exercised by the other synchronization circuit connected to the relevant channel. This condition can be satisfied by way of a suitable choice of the relevative drive power of the transistors connected to such a conductor. Notably the drive power of the pull-up transistor (or combination of transistors) in the synchronization circuit generating the attention signal must be stronger than that of the pull-down transistor or combination of transistors in the synchronization circuit receiving the attention signal. This can be realized by choosing suitable current gain factors for the relevant transistors.

Subject to these conditions, the network of synchronization circuits will initialize itself.

Coupling to four-phase interface

As is shown in FIG. 1, the synchronization circuits 2a–f are coupled to the sub-circuits 1a–f. This may be realized via a four-phase interface. The use of a four-phase interface offers the advantage that no special speed requirements need be imposed on the subcircuits 1a–f and that use can be made of conventional sub-circuits with four-phase interfaces.

Figure 8:
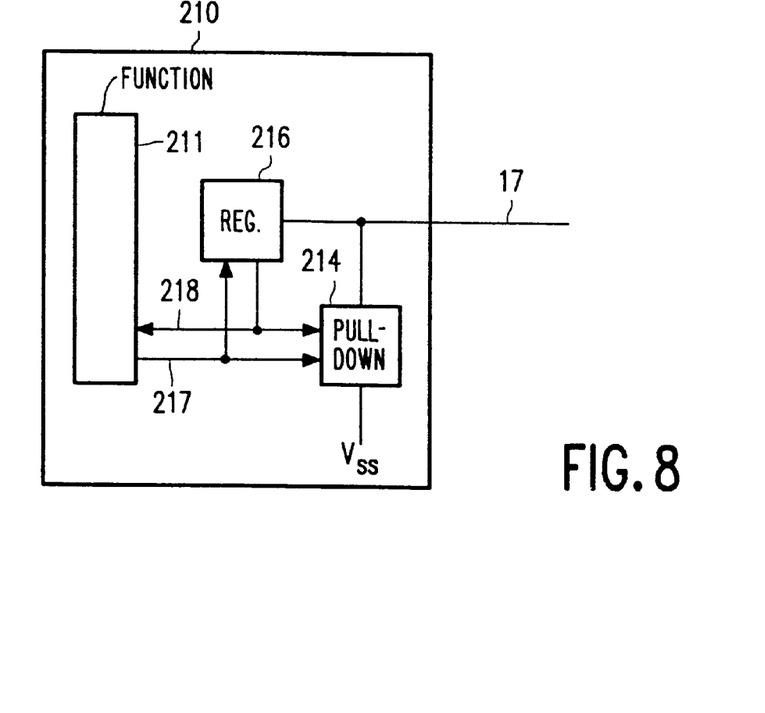
FIG. 8 shows a circuit comprising a four-phase interface.

FIG. 8 shows a circuit in accordance with the invention with a four-phase interface. The Figure shows a sub-circuit 210 which is connected to a conductor 17. In the sub-circuit 210 the conductor 17 is coupled to a first supply connection Vss via a pull-down circuit 214. The conductor is also coupled to a set input of a first register 216. The sub-circuit 210 comprises a functional part 211 which comprises a four-phase interface with an output 217 and an input 218. The output 217 of the first four-phase interface is coupled to a first control input of the pull-down circuit 214 and to a reset input of the first register 216. An output of the first register 216 is coupled to a second control input of the pull-down circuit 214 and to an input of the first four-phase interface.

Figure 9:
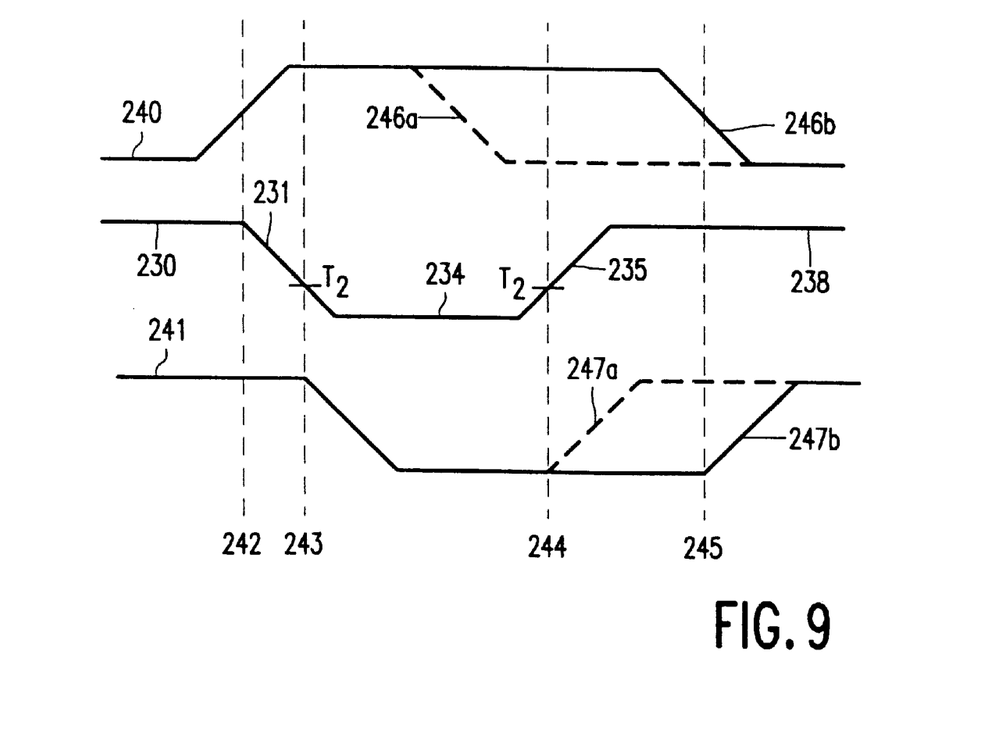
FIG. 9 shows three potential variations in a four-phase interface as a function of time.

The operation of the circuit shown in FIG. 8 will be described with reference to FIG. 9. FIG. 9 shows three potential variations as a function of time; from the top downwards there are shown the potential variation 240 on the output 217 of the four-phase interface, the potential variation on the conductor 17, and the potential variation 241 on the input 218 of the four-phase interface.

Initially the potential on the output 217 is low and the potentials on the conductor 17 and the input 218 are high 230; this corresponds to the reset state of the first register 216. The functional part will then initiate the handshake by making the potential on the output 217 high. At the instant 242 at which the potential has become sufficiently high, the pull-down circuit 214 becomes active. As a result, the potential on the conductor 17 decreases, constituting the attention signal 231. At the instant 243, at which the potential on the conductor 17 reaches the threshold level T2, the first register 216 is reset. As a result, the potential level on the input 218 of the four-phase interface decreases. This informs the functional part 211 that the low-high transition of the potential on the output 217 of the four-phase interface has been processed and that the functional part can pull down the potential on the output 217 of the four-phase interface again.

The attention signal 231 is succeeded by the acknowledge signal 235 as described with reference to FIG. 2a. The transition in the potential level 241 on the input 218 of the four-phase interface is succeeded by a transition 246a–b in the level of the potential 240 on the output 217 of the four-phase interface. The first register 216 is reset when the potential on the output of the four-phase interface is low.

However, the "set" effect of the potential on the conductor 17 then has priority; setting is possible only as from the instant 244 at which the level of this potential becomes sufficiently high again in the context of the acknowledge signal 235 (for example, higher than T2). In dependence on whether the instant at which the potential 240 on the output of the four-phase interface becomes low is before (246a) or after (246b) the acknowledge signal 235, the potential on the input 218 of the four-phase interface thus becomes high (247a) together with the acknowledge signal 235 or (247b) together with the high-low transition of the potential on the output 217 of the four-phase interface. The circuit is then ready for a next handshake.

Transistor level realizations

Figure 10:
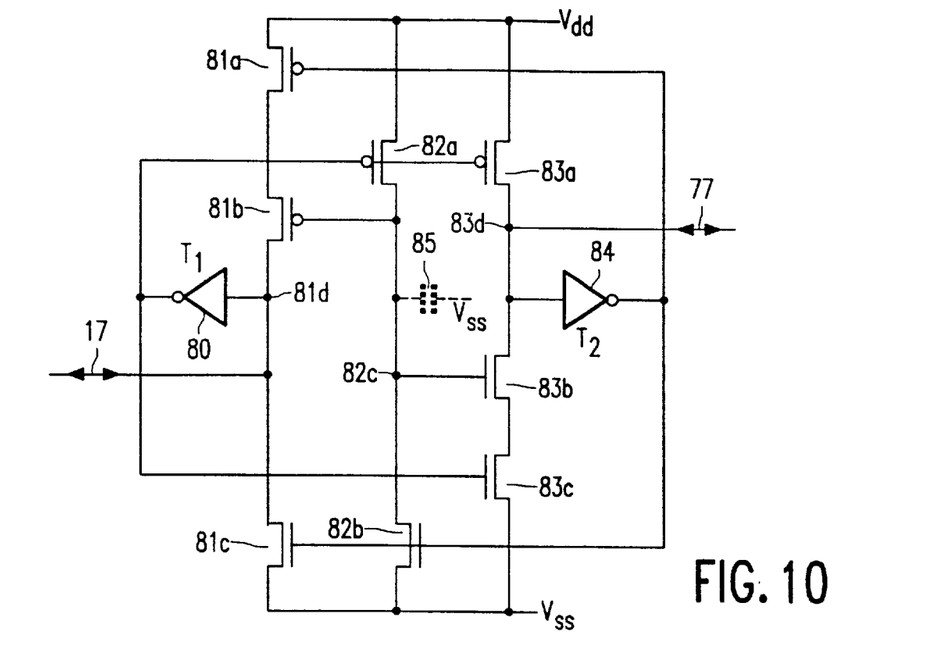
FIG. 10 shows an embodiment of the central sub-circuit of FIG. 5.

FIG. 10 shows an embodiment of the central sub-circuit 70 of FIG. 5 which, moreover, provides the functions of the control circuit 44, 54 and the transistors 42a, 52a. This embodiment comprises a first, a second and a third current branch 81a–d, 82a–c, 83a–d, respectively, between the first supply connection Vdd and the second supply connection Vss.

The first current branch comprises successively in series a series connection of channels of two PMOS transistors 81a,b, a first junction 81d, and the channel of an NMOS transistor 81c. The second current branch comprises successively in series the channel of a PMOS transistor 82a, a second junction 82c and the channel of an NMOS transistor 82b. The third current branch comprises successively in series the channel of a PMOS transistor 83a, a third junction 83d and a series connection of the channels of two NMOS transistors 83b,c. A parasitic capacitance 85 is symbolically indicated so as to be connected to the second junction.

The first conductor 17 is coupled to the first junction 81d. The first junction 81d is coupled, via a first inverter 80, to the gates of the PMOS transistors in the second and the third current branch and to the gate of one of the series-connected NMOS transistors (83c) in the third current branch. The gate of the other series-connected NMOS transistor (83b) in the third current branch is coupled to the second junction 82c.

The second conductor 77 is coupled to the third junction 83d. The third junction 83d is coupled, via a second inverter 84, to the gates of the NMOS transistors in the first and the second current branch and to the gate of one of the series-connected PMOS transistors (81a) in the first current branch. The gate of the other series-connected PMOS transistor (81b) in the first current branch is coupled to the second junction 82c.

During operation the first current branch 81a–d serves to control the first conductor 17; the third current branch 83a–d serves to control the second conductor 77. The second current branch serves as a dynamic register.

The NMOS transistor 83c in the third current branch serves to pull down the potential on the second conductor 77 in response to the attention signal. The PMOS transistor 83a serves to keep this signal high after the acknowledge signal. The PMOS transistor 83a is turned on as soon as the acknowledge signal on the first conductor 17 has been passed on. The first current branch 81a–d operates in the same way as the third current branch 83a–d, be it that the roles of the first and the second conductor 17, 77, the supply voltages Vdd, Vss, and the acknowledge signal and the attention signal are reversed.

The register (formed by the second current branch 82a–c) is adjusted to the low state when an attention has been generated on the second conductor 77, and is adjusted to the high state when an acknowledge signal has been generated on the first conductor. By way of the NMOS transistor 83b in the third current branch it blocks the generating of a new attention signal before acknowledgement of a previous attention signal on the first conductor 17 has been passed on.

The threshold voltages of the first and the second inverter 80, 84 determine $T_1$ on the first conductor 17 and $T_2$ on the second conductor 77, respectively. They also determine $T_4$ on the first conductor 17 and $T_3$ on the second conductor 77. The threshold voltage ($T_1=T_4$) of the first inverter 80 is chosen to be higher than the threshold voltage ($T_2=T_3$) of the second inverter 84.

On the basis of the function description of the various synchronization circuits (join, fork etc.) and the FIGS. 6, 9 and 10 it will be evident to those skilled in the art that the various sub-circuits can be constructed analogously to the embodiment shown in FIG. 10. For each conductor a respective current branch (analogous to 81a–d or 83a–d) is then required and the necessary registers are realized by means of one or more current branches (82a–c). The connections between the current branches and the logic conditions according to which these branches connect their output to the power supplies follow from the function of the relevant synchronization circuit.

Evidently, the dynamic registers as formed by the current branch 82a–c may be replaced by static registers (for example, flip-flops).

Figure 11:
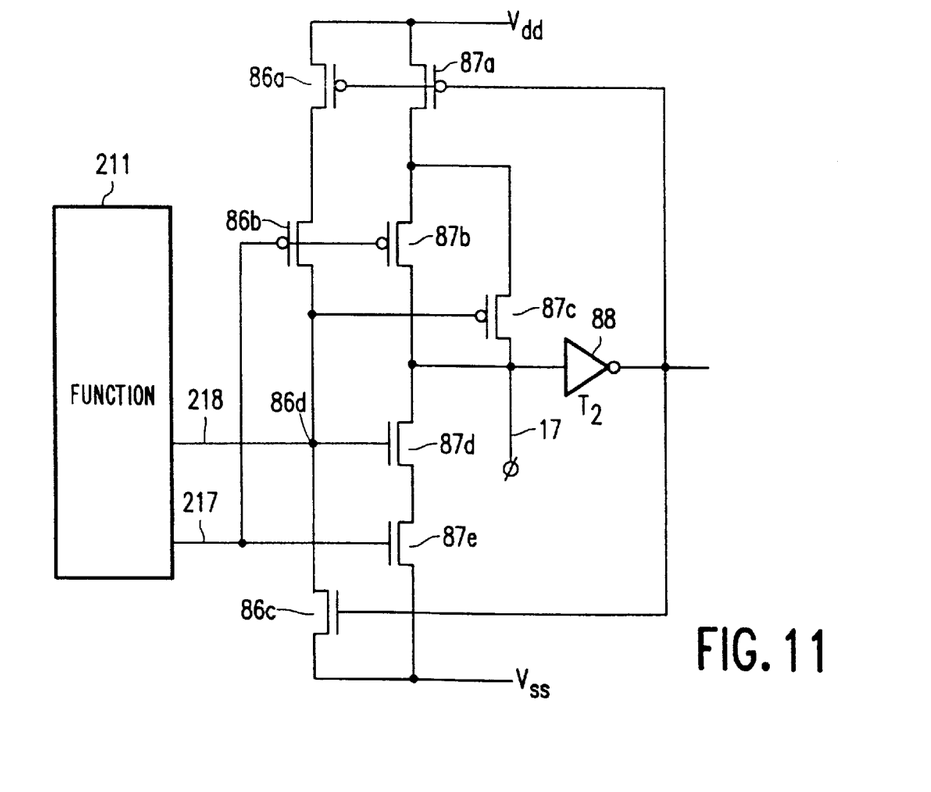
FIG. 11 shows an embodiment of a sub-circuit with a four-phase interface.

FIG. 11 shows an embodiment of a sub-circuit in accordance with the invention with a four-phase interface. In this embodiment not only the function of the feedback circuit is realized but also that of the control circuit.

FIG. 11 shows a first and a second current branch, 86a–d, 87a–f. Connected between the supply connections Vdd, Vss, the first current branch successively comprises in series a series connection of the channels of a first and a second PMOS transistor 86a–b, a first junction 86d and the channel of a first NMOS transistor 86c. The second current branch successively comprises in series the channel of a third PMOS transistor 87a, a parallel connection of the channels of a fourth and a fifth PMOS transistor 87b–c, a second junction 87f, and a series connection of channels of a second and a third NMOS transistor 87d–e.

The output 217 of the four-phase interface is coupled to the gates of the second and the fourth PMOS transistor 86b, 87b and to the gate of the third NMOS transistor 87e. The input 218 of the four-phase interface is coupled to the first junction 86d and to the gate of the third NMOS transistor 87d. The second junction 87f is coupled to the conductor 17 and, via an inverter 88, to the gates of the first and the third PMOS transistor 86a, 87a and to that of the third NMOS transistor 86c. The inverter 88 has a threshold voltage T2.

During operation the effect of the circuit of FIG. 11 is as described with reference to FIG. 9, the PMOS transistors 87a–d additionally serving to keep the potential on the conductor 17 high after reception of the acknowledge signal 235 until a new attention signal is received. During operation the first current branch 86a–d serves as a dynamic register (cf. register 216). The first NMOS transistor 86c serves to set this register. The second PMOS transistor 86b serves to reset this register. The third NMOS transistor 87e serves to generate the attention signal 231. The second NMOS transistor 87d serves to turn off the connection between the conductor 17 and the supply connection Vss if the potential on the conductor is sufficiently low.

Figure 12:
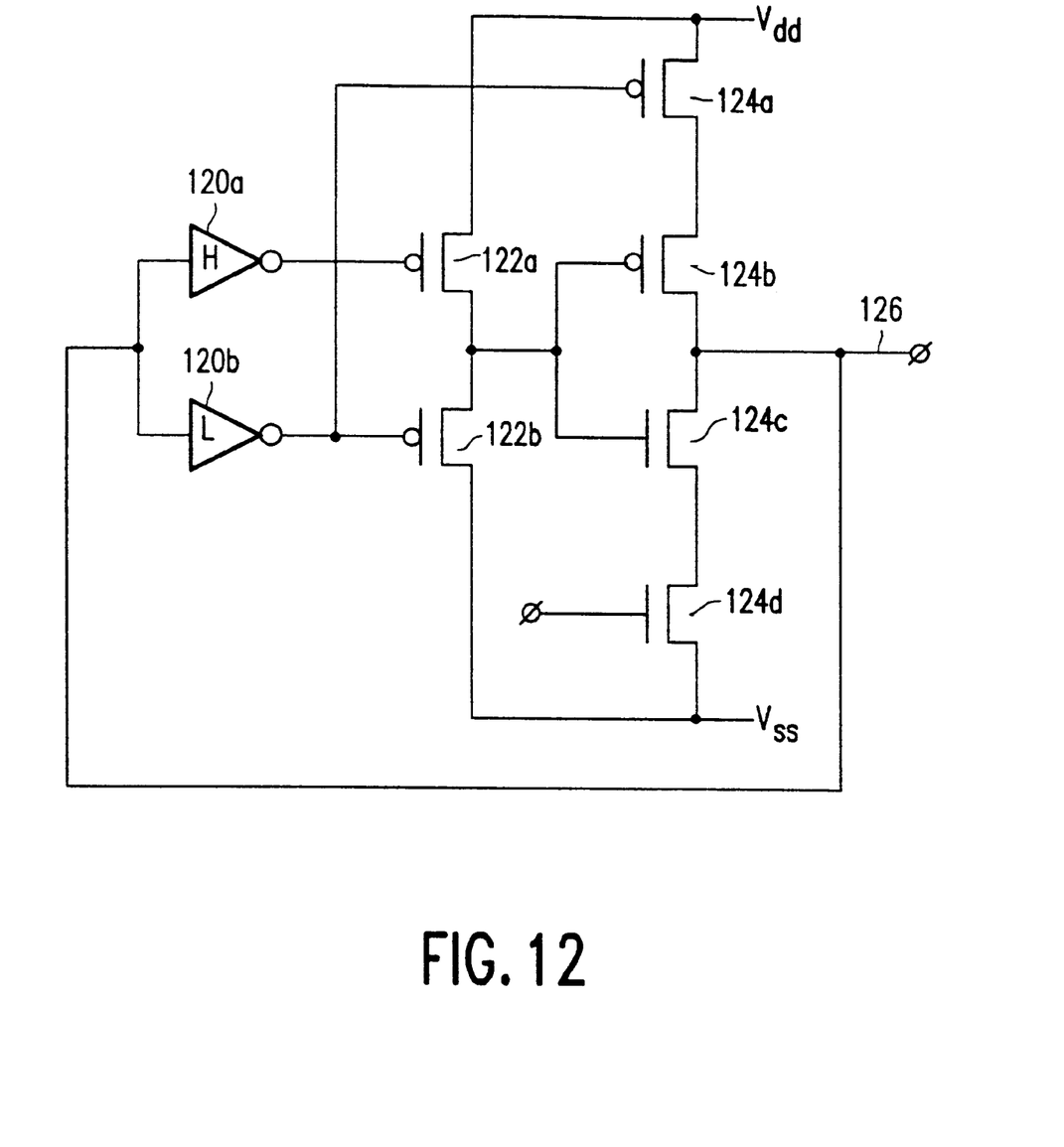
FIG. 12 shows an embodiment of a repeater.

FIG. 12 shows an embodiment of the repeater 2f of FIG. 1. This embodiment comprises an active connection 126 for the handshakes. The active connection 126 is coupled to the input of a first and a second inverter 120a,b, having a high and a low threshold, respectively. The circuit comprises a first current branch 122*a–b* which includes, connected between the supply connections Vdd, Vss, a series connection of the channels of a PMOS transistor 122*a* and an NMOS transistor 122*b*. The outputs of the first and the second inverter 120*a,b* are coupled to the gates of the PMOS transistor 122*a* and the NMOS transistor 122*b*, respectively, in this current branch.

The circuit also comprises a second current branch 124*a–d* which includes, connected between the supply connections Vdd, Vss, a series connection of the channels of successively a first PMOS transistor 124*a*, a second PMOS transistor 124*b*, a first NMOS transistor 124*c* and a second NMOS transistor 124*d*. The output of the second inverter 120*b* is coupled to the gate of the first PMOS transistor 124*a*. A junction of the transistors 122*a,b* in the first current branch is coupled to the gates of the second PMOS transistor 124*b* and the first NMOS transistor 124*c*. During operation the second NMOS transistor 124*d* of the second current branch serves as an enable transistor. When this transistor is turned on, the circuit shown in FIG. 12 generates an attention signal by pulling down the potential on the active connection 126. Because the signal on the active connection 126 is low, the first PMOS transistor 124*a* and the first NMOS transistor 124*c* in the second current branch will not be turned on. The active connection 126 can thus receive an acknowledge signal whereby the potential on the active connection is made high again.

As soon as the potential on the active connection 126 exceeds the threshold of the second inverter 120*b* in response to the acknowledge signal, the first PMOS transistor 124*a* in the second current branch is turned on. For as long as this potential is still below the threshold of the first inverter 120*a*, moreover, the second PMOS transistor 124*b* of the second current branch is turned on. As a result, the potential on the active connection 126 is pulled up further. If the potential on the active connection 126 exceeds the threshold of the first inverter, the second PMOS transistor 124*b* is turned off and the first NMOS transistor 124*c* is turned on. As a result, the potential on the active connection 126 is pulled down again, thus forming a new attention signal.

As long as the second NMOS transistor 124*d* in the second current branch is turned on, the circuit shown in FIG. 12 thus carries out an unlimited series of one-line handshakes. The second NMOS transistor 124*d* serves, for example as an enable signal or, alternatively, can be turned off after a predetermined number of handshakes has been counted. Furthermore, the second transistor 124*d* can be included in a further handshake circuit so as to receive an incoming attention signal, start the generating of the unlimited series of handshakes, and acknowledge the incoming attention signal.

I claim:

1. A circuit comprising a network of channels and synchronization circuits for coordinating the timing of operations of asynchronously operating sub-circuits which are connected to a periphery of the network, each channel being coupled between a respective pair of said synchronization circuits which pair execute successive handshakes together, in each handshake a first synchronization circuit and a second synchronization circuit of said respective pair synchronization circuits successively sending one another, via the respective said channel, an attention signal and an acknowledge signal, at least one of said synchronization circuits of said respective pair being coupled between a first and a second of said channels, starting a handshake on the second channel upon reception of the attention signal on the first channel, and generating the acknowledge signal on the first channel in response to the completion of said handshake, all of said synchronization circuits in said network being connected to one another by said channels, either directly or via other said synchronization circuits, so that the handshakes propagate to the sub-circuits through the network, characterized in that; at least the first and the second one of the channels comprise only one conductor each and that on each of these conductors the attention signal and the acknowledge signal of the handshake are formed by mutually opposed transitions in a potential level on the conductor.

2. A circuit as claimed in claim 1, characterized in that; at least one of said first and the second channels connects the first synchronization circuit to a second synchronization circuit, that the first and the second synchronization circuit each comprises a respective first switching element connected between the conductor and a respective first and a second supply terminal, and that the first and the second synchronization circuit each realizes a respective transition from the handshake by turning on the respective first switching element and, once the respective transition has been realized, by subsequently turning the respective first switching element off again.

3. A circuit as claimed in claim 2, characterized in that the first and the second synchronization circuit both have a respective feedback circuit coupled between the conductor and a control input of said respective switching element of the relevant synchronization circuit to turn off said respective first switching element in response to the detection of completion of the respective transition by the relevant synchronization circuit.

4. A circuit as claimed in claim 3, characterized in that the first synchronization circuit comprises a second switching element connected between the conductor and the second supply terminal, and control means coupled between the conductor and a control input off said second switching element, the control means being arranged to turn on said second switching element in response to the detection of the transition realized by the second synchronization circuit, and to turn said second switching element off when the opposite transition is realized.

5. A circuit as claimed in claim 4, characterized in that the transition realized by the second synchronization circuit adjusts the potential level from a first to a second potential range, which ranges are separated from one another by a non-void intermediate range, that the control means turn on said second switching element of the second synchronization circuit when the potential level leaves the first potential range, and that the feedback circuit of the second synchronization circuit turns off said first switching element of the second synchronization circuit when the potential level reaches the second potential range.

6. A circuit as claimed in claim 5, characterized in that the first synchronization circuit is connected to a third channel and is arranged to carry out further handshakes via said third channel, the handshakes via the first channel, the second channel and the third channel being coordinated in conformity with one of the following functionalities:

sequencing, where the handshake on the third channel is started in response to completion of the handshake on the second channel and where the acknowledge signal on the first channel is generated in response to completion of the handshake on the second channel, forking, where the handshakes on the second and the third channel are started, independently of one another, in response to the attention signal, the acknowledge signal on the first channel being generated in response to completion of the handshake on the second as well as the third channel, joining, where the handshake on the second channel is started after reception of an attention signal on the first as well as the third channel, and where an acknowledge signal is generated on the first as well as the third channel in response to completion of the handshake on the second channel, mixing, where the handshake on the second channel is started after reception of an attention signal on at least one of the first and third channels, and where in response to the completion of the handshake on the second channel an acknowledge signal is generated on the at least one channel on which the attention signal was received.

7. A circuit as claimed in claim 5, characterized in that at least one of the synchronization circuits is a repeater circuit coupled to either of said channels and generates, each time in response to a potential level transition on the conductor, an opposed potential level transition on the conductor.

8. A circuit as claimed in claim 5, characterized in that the first synchronization circuit is an arbiter circuit coupled to a third and a fourth said channel and executes the handshake on the fourth channel in response to the attention signal on the third channel, and generates, in response to completion of said handshake on the third channel, an acknowledge signal on the third channel, the arbiter circuit delaying the starting of the handshake on the fourth and the second channel, respectively, until after completion of a possibly not yet completed handshake on the second and the fourth channel, respectively.

9. A circuit as claimed in claims 1 to 8, characterized in that the network is acyclic, that each of said synchronization circuits is arranged to adjust all channels on which it can generate attention signals to an initial potential level which corresponds to the level which directly precedes an attention signal, provided that all channels on which the relevant synchronization circuit can receive attention signals are at said initial potential level, and in that the respective relative drive powers of the synchronization circuits are chosen so that the synchronization circuits are capable of adjusting the channels on which they can generate attention signals to the initial potential level, irrespective of the driving of said channels by the other synchronization circuits.

10. A circuit as claimed in claim 9, characterized in that said circuit is integrated in a single integrated circuit which comprises the conductor as well as the first and the second synchronization circuits.

11. A circuit as claimed in claim 2, characterized in that the first synchronization circuit comprises a second switching element connected between the conductor and the second supply terminal, and control means coupled between the conductor and a control input of said second switching element, the control means being arranged to turn on said second switching element in response to the detection of the transition realized by the second synchronization circuit, and to turn said second switching element off when the opposite transition is realized.

12. A circuit as claimed in claim 11, characterized in that the transition realized by the second synchronization circuit adjusts the potential level from a first to a second potential range, which ranges are separated from one another by a non-void intermediate range, that the control means turn on said second switching element of the second synchronization circuit when the potential level leaves the first potential range, and that the feedback circuit of the second synchronization circuit turns off said first switching element of the second synchronization circuit when the potential level reaches the second potential range.

13. A circuit as claimed in claim 1, characterized in that the first synchronization circuit is connected to a third channel and is arranged to carry out further handshakes via said third channel, the handshakes via the first channel, the second channel and the third channel being coordinated in conformity with one of the following functionalities:

sequencing, where the handshake on the third channel is started in response to completion of the handshake on the second channel and where the acknowledge signal on the first channel is generated in response to completion of the handshake on the second channel, forking, where the handshakes on the second and the third channel are started, independently of one another, in response to the attention signal, the acknowledge signal on the first channel being generated in response to completion of the handshake on the second as well as the third channel, joining, where the handshake on the second channel is started after reception of an attention signal on the first as well as the third channel, and where an acknowledge signal is generated on the first as well as the third channel in response to completion of the handshake on the second channel, mixing, where the handshake on the second channel is started after reception of an attention signal on at least one of the first and third channels, and where in response to the completion of the handshake on the second channel an acknowledge signal is generated on the at least one channel on which the attention signal was received.

14. A circuit as claimed in claim 2, characterized in that the first synchronization circuit is connected to a third channel and is arranged to carry out further handshakes via said third channel, the handshakes via the first channel, the second channel and the third channel being coordinated in conformity with one of the following functionalities:

sequencing, where the handshake on the third channel is started in response to completion of the handshake on the second channel and where the acknowledge signal on the first channel is generated in response to completion of the handshake on the second channel, forking, where the handshakes on the second and the third channel are started, independently of one another, in response to the attention signal, the acknowledge signal on the first channel being generated in response to completion of the handshake on the second as well as the third channel, joining, where the handshake on the second channel is started after reception of an attention signal on the first as well as the third channel, and where an acknowledge signal is generated on the first as well as the third channel in response to completion of the handshake on the second channel, mixing, where the handshake on the second channel is started after reception of an attention signal on at least one of the first and third channels, and where in response to the completion of the handshake on the second channel an acknowledge signal is generated on the at least one channel on which the attention signal was received.

15. A circuit as claimed in claim 1, characterized in that at least one of the synchronization circuits is a repeater circuit coupled to either of said 1st or 2nd channels and generates, each time in response to a potential level transition on the conductor, an opposed potential level transition on the conductor.

16. A circuit as claimed in claim 2, characterized in that at least one of the synchronization circuits is a repeater circuit coupled to either of said channels and generates, each time in response to a potential level transition on the conductor, an opposed potential level transition on the conductor.

17. A circuit as claimed in claim 1, characterized in that the first synchronization circuit is an arbiter circuit coupled to a third and a fourth said channel and execute a handshake on the fourth channel in response to an attention signal on the third channel, and to generate, in response to completion of said handshake on the third channel, the acknowledge signal on the third channel, the arbiter circuit delaying the starting of the handshake on the fourth and the second channel, respectively, until after completion of a possibly not yet completed handshake on the second and the fourth channel, respectively.

18. A circuit as claimed in claim 2, characterized in that the first synchronization circuit is an arbiter circuit coupled to a third and a fourth said channel and executes a handshake on the fourth channel in response to an attention signal on the third channel, and to generate, in response to completion of said handshake on the third channel, the acknowledge signal on the third channel, the arbiter circuit delaying the starting of the handshake on the fourth and the second channel, respectively, until after completion of a possibly not yet completed handshake on the second and the fourth channel, respectively.

19. A circuit as claimed in claim 1, characterized in that the network is acyclic, that each of said synchronization circuits is arranged to adjust all channels on which it can generate attention signals to an initial potential level which corresponds to the level which directly precedes the attention signal, provided that all channels on which the relevant synchronization circuit can receive attention signals are at said initial potential level, and in that the respective relative drive powers of the synchronization circuits are chosen so that the synchronization circuits are capable of adjusting the channels on which they can generate attention signals to the initial potential level, irrespective of the driving of said channels by the other synchronization circuits.

20. A circuit as claimed in claim 2, characterized in that the network is acyclic, that each of said synchronization circuits is arranged to adjust all channels on which it can generate attention signals to an initial potential level which corresponds to the level which directly precedes the attention signal, provided that all channels on which the relevant synchronization circuit can receive attention signals are at said initial potential level, and in that the respective relative drive powers of the synchronization circuits are chosen so that the synchronization circuits are capable of adjusting the channels on which they can generate attention signals to the initial potential level, irrespective of the driving of said channels by the other synchronization circuits.

21. A circuit as claimed in claim 1, characterized in that said circuit is integrated in a single integrated circuit which comprises the conductor as well as the first and the second synchronization circuits.

* * * * *